(12) United States Patent
Wang

(10) Patent No.: US 7,801,058 B2
(45) Date of Patent: Sep. 21, 2010

(54) METHOD AND SYSTEM FOR DYNAMIC INFORMATION EXCHANGE ON MESH NETWORK DEVICES

(75) Inventor: Ray Wang, McLean, VA (US)

(73) Assignee: Mobitrum Corporation, Silver Spring, MD (US)

( * ) Notice: Subject to any disclaimer, the term of this patent is extended or adjusted under 35 U.S.C. 154(b) by 560 days.

(21) Appl. No.: 11/880,271

(22) Filed: Jul. 20, 2007

(65) Prior Publication Data

US 2008/0025330 A1    Jan. 31, 2008

Related U.S. Application Data

(60) Provisional application No. 60/833,741, filed on Jul. 27, 2006.

(51) Int. Cl.
H04L 12/28    (2006.01)
(52) U.S. Cl. .................................. 370/254; 338/406
(58) Field of Classification Search ............... 370/248, 370/252, 254, 338, 406, 408
See application file for complete search history.

(56) References Cited

U.S. PATENT DOCUMENTS

| | | | |
|---|---|---|---|
| 3,960,722 A | 6/1976 | Tomikawa |
| 4,048,075 A | 9/1977 | Colvin |
| 4,053,677 A | 10/1977 | Corao |
| 4,119,096 A | 10/1978 | Drews |
| 4,135,564 A | 1/1979 | Muller |
| 4,142,950 A | 3/1979 | Creamer |
| 4,158,275 A | 6/1979 | Moore |
| 4,221,854 A | 9/1980 | Hammar |
| 4,222,563 A | 9/1980 | Heftler |
| 4,226,408 A | 10/1980 | Tomita |
| 4,280,075 A | 7/1981 | Comby |
| 4,286,362 A | 9/1981 | Hammar |
| 4,342,884 A | 8/1982 | Ban |
| 4,343,690 A | 8/1982 | de Nora |
| 4,373,027 A | 2/1983 | Berneman |
| 4,400,287 A | 8/1983 | Kimura |
| 4,440,000 A | 4/1984 | Bacchus |
| 4,455,187 A | 6/1984 | von Blucher |
| 4,479,875 A | 10/1984 | Nelson |
| 4,562,015 A | 12/1985 | Lefevre |
| 4,564,539 A | 1/1986 | Tsuji |
| 4,654,556 A | 3/1987 | Comby |
| 4,693,986 A | 9/1987 | Vit |
| 4,698,768 A | 10/1987 | Thuy |
| 4,751,869 A | 6/1988 | Paynter |
| 4,781,056 A | 11/1988 | Noel |
| 4,788,088 A | 11/1988 | Kohl |
| 4,837,850 A | 6/1989 | Maisel |
| 4,917,537 A | 4/1990 | Jacobson |
| 4,940,972 A | 7/1990 | Mouchot |

(Continued)

*Primary Examiner*—Jayanti K Patel
*Assistant Examiner*—Jung Park
(74) *Attorney, Agent, or Firm*—Lesavich High-Tech Law Group, P.C.; Stephen Lesavich

(57) ABSTRACT

A method and system for dynamic information exchange on mesh network devices. A mesh network device with integrated features creates an N-way mesh network with a full mesh network topology or a partial mesh network or an ad-hoc network topology. The mesh network device is able to dynamically exchange information with other mesh network devices using stored profiles (e.g., personal data, advertisements, instant coupons, location-aware information, etc.) via a mesh network or partial mesh network or ad-hoc network.

20 Claims, 8 Drawing Sheets

U.S. PATENT DOCUMENTS

| | | | |
|---|---|---|---|
| 5,034,352 A | 7/1991 | Vit |
| 5,042,463 A | 8/1991 | Lekholm |
| 5,105,424 A | 4/1992 | Flaig |
| 5,128,789 A | 7/1992 | Abramovitz |
| 5,182,440 A | 1/1993 | Dufour |
| 5,207,687 A | 5/1993 | Bernon |
| 5,218,565 A | 6/1993 | Mou |
| 5,236,027 A | 8/1993 | Lu |
| 5,309,107 A | 5/1994 | Pausch |
| 5,365,518 A | 11/1994 | Noser |
| 5,396,359 A | 3/1995 | Abramovitz |
| 5,447,776 A | 9/1995 | Disselbeck |
| 5,448,389 A | 9/1995 | Peacock |
| 5,477,888 A | 12/1995 | Mezzalira |
| 5,512,828 A | 4/1996 | Pausch |
| 5,530,575 A | 6/1996 | Acampora |
| 5,545,318 A | 8/1996 | Richmond |
| 5,550,805 A | 8/1996 | Takatori |
| 5,571,080 A | 11/1996 | Jensen |
| 5,571,352 A | 11/1996 | Disselbeck |
| 5,581,187 A | 12/1996 | Pausch |
| 5,592,610 A | 1/1997 | Chittor |
| 5,606,666 A | 2/1997 | Grant |
| 5,670,278 A | 9/1997 | Disselbeck |
| 5,682,537 A | 10/1997 | Davies |
| 5,689,647 A | 11/1997 | Miura |
| 5,703,834 A | 12/1997 | Bonnefoy |
| 5,802,054 A | 9/1998 | Bellenger |
| 5,842,034 A | 11/1998 | Bolstad et al. |
| 5,884,017 A | 3/1999 | Fee |
| 5,891,632 A | 4/1999 | Imai |
| 5,934,614 A | 8/1999 | Mueller |
| 5,949,760 A | 9/1999 | Stevens |
| 5,959,999 A | 9/1999 | An |
| 5,963,546 A | 10/1999 | Shoji |
| 6,038,044 A | 3/2000 | Fee |
| 6,049,593 A | 4/2000 | Acampora |
| 6,113,080 A | 9/2000 | Kazuma |
| 6,143,029 A | 11/2000 | Rippstein |
| 6,154,587 A | 11/2000 | Okayama |
| 6,189,102 B1 | 2/2001 | Beser |
| 6,219,346 B1 | 4/2001 | Maxemchuk |
| 6,256,306 B1 | 7/2001 | Bellenger |
| 6,298,053 B1 | 10/2001 | Flammer, III |
| 6,314,163 B1 | 11/2001 | Acampora |
| 6,324,162 B1 | 11/2001 | Chaudhuri |
| 6,329,902 B1 | 12/2001 | Lee |
| 6,370,110 B1 | 4/2002 | Eslambolchi |
| 6,396,837 B1 | 5/2002 | Wang |
| 6,403,210 B1 | 6/2002 | Stuivinga |
| 6,460,128 B1 | 10/2002 | Baxter |
| 6,480,497 B1 | 11/2002 | Flammer, III |
| 6,549,513 B1 | 4/2003 | Chao |
| 6,618,611 B2 | 9/2003 | Gebhardt |
| 6,640,087 B2 | 10/2003 | Reed et al. |
| 6,654,379 B1 | 11/2003 | Grover |
| 6,711,166 B1 | 3/2004 | Amir |
| 6,735,393 B1 | 5/2004 | Zouganeli |
| 6,763,190 B2 | 7/2004 | Agrawal |
| 6,780,340 B2 | 8/2004 | Conta |
| 6,785,725 B1 | 8/2004 | Ramanan |
| 6,805,732 B1 | 10/2004 | Billiotte |
| 6,823,180 B2 | 11/2004 | Reed |
| 6,835,173 B2 | 12/2004 | Couvillon, Jr. |
| 6,848,006 B1 | 1/2005 | Hermann |
| 6,850,502 B1 | 2/2005 | Kagan |
| 6,853,641 B2 | 2/2005 | Lindhorst-Ko |
| 6,856,592 B2 | 2/2005 | Grover |
| 6,879,574 B2 | 4/2005 | Naghian |
| 6,904,364 B2 | 6/2005 | Randazzo |
| 6,909,903 B2 | 6/2005 | Wang |
| 6,912,204 B2 | 6/2005 | Kossi |
| 6,917,759 B2 | 7/2005 | DeBoer |
| 6,934,248 B1 | 8/2005 | DeBoer |
| 6,940,866 B1 | 9/2005 | Miller |
| 6,948,048 B2 | 9/2005 | Baxter |
| 6,965,575 B2 | 11/2005 | Srikrishna |
| 6,965,969 B2 | 11/2005 | Burger |
| 6,970,417 B1 | 11/2005 | Doverspike |
| 6,970,808 B2 | 11/2005 | Abhulimen |
| 6,999,441 B2 | 2/2006 | Flammer, III |
| 7,003,313 B2 | 2/2006 | Garces |
| 7,012,887 B2 | 3/2006 | Zhu |
| 7,027,388 B2 | 4/2006 | Wen |
| 7,031,293 B1 | 4/2006 | Srikrishna |
| 7,031,757 B2 | 4/2006 | Schwengler |
| 7,039,067 B2 | 5/2006 | Feinberg |
| 7,042,988 B2 | 5/2006 | Juitt |
| 7,043,250 B1 | 5/2006 | DeMartino |
| 7,050,819 B2 | 5/2006 | Schwengler |
| 7,053,853 B2 | 5/2006 | Merenda |
| 7,054,262 B2 | 5/2006 | Gerstel |
| 7,058,021 B2 | 6/2006 | Srikrishna |
| 7,068,873 B2 | 6/2006 | Frankel |
| 7,069,483 B2 | 6/2006 | Gillies |
| 7,088,676 B1 | 8/2006 | Doverspike |
| 7,088,920 B2 | 8/2006 | Krishnaswamy |
| 7,089,089 B2 | 8/2006 | Cumming |
| 7,106,261 B2 | 9/2006 | Nagel |
| 7,117,466 B2 | 10/2006 | Kalafala |
| 7,119,758 B2 | 10/2006 | Louzir |
| 7,123,589 B1 | 10/2006 | Dawes |
| 7,133,359 B2 | 11/2006 | Weis |
| 7,203,743 B2 | 4/2007 | Shah-Heydari |
| 7,215,658 B2 | 5/2007 | Alastalo |
| 7,215,926 B2 | 5/2007 | Corbett |
| 7,224,642 B1 | 5/2007 | Tran |
| 7,233,620 B2 | 6/2007 | Brommer |
| 7,239,238 B2 | 7/2007 | Tester |
| 7,239,850 B2 | 7/2007 | Peikari |
| 7,242,664 B2 | 7/2007 | Einstein |
| 7,245,216 B2 | 7/2007 | Burkley |
| 7,248,217 B2 | 7/2007 | Mani |
| 7,251,570 B2 | 7/2007 | Hancock |
| 7,257,106 B2 | 8/2007 | Chen |
| 7,257,250 B2 | 8/2007 | Boier-Martin |
| 7,260,059 B2 | 8/2007 | Grover |
| 7,262,694 B2 | 8/2007 | Olsen |
| 7,263,379 B1 | 8/2007 | Parkulo |
| 7,269,347 B1 | 9/2007 | Matricardi |
| 7,271,736 B2 | 9/2007 | Siegel |
| 7,274,869 B1 | 9/2007 | Pan |
| 7,277,931 B1 | 10/2007 | Booth |
| 7,280,755 B2 | 10/2007 | Kang |
| 7,282,944 B2 | 10/2007 | Gunn |
| 7,283,494 B2 | 10/2007 | Hammel |
| 7,283,838 B2 | 10/2007 | Lu |
| 7,289,428 B2 | 10/2007 | Chow |
| 7,289,923 B2 | 10/2007 | Marovitz |
| 7,295,806 B2 | 11/2007 | Corbett |
| 7,298,240 B2 | 11/2007 | Lamar |
| 7,301,824 B1 | 11/2007 | New |
| 7,302,339 B2 | 11/2007 | Gray |
| 7,305,459 B2 | 12/2007 | Klemba |
| 7,308,198 B1 | 12/2007 | Chudack |
| 7,308,370 B2 | 12/2007 | Mason, Jr. et al. |
| 7,313,399 B2 | 12/2007 | Rhee et al. |
| 7,586,888 B2 | 9/2009 | Wang |
| 7,630,736 B2 | 12/2009 | Wang |
| 2002/0089712 A1 | 7/2002 | Kang |
| 2002/0181427 A1 | 12/2002 | Sparr et al. |
| 2003/0011839 A1 | 1/2003 | Liang |
| 2004/0248601 A1* | 12/2004 | Chang ........................ 455/500 |
| 2005/0038876 A1* | 2/2005 | Chaudhuri .................. 709/219 |

| | | | | | |
|---|---|---|---|---|---|
| 2005/0048961 A1* | 3/2005 | Ribaudo et al. ............ 455/419 | 2006/0154642 A1 | 7/2006 | Scannell |
| 2005/0071714 A1 | 3/2005 | Soga et al. | 2006/0159024 A1 | 7/2006 | Hester |
| 2005/0074019 A1 | 4/2005 | Handforth | 2006/0182076 A1 | 8/2006 | Wang |
| 2005/0135286 A1 | 6/2005 | Nurminen et al. | 2006/0218225 A1* | 9/2006 | Hee Voon et al. ........... 709/201 |
| 2005/0138359 A1 | 6/2005 | Simon | 2006/0262737 A1 | 11/2006 | Livet |
| 2005/0141641 A1 | 6/2005 | Tanaka et al. | 2006/0268910 A1 | 11/2006 | Kawahara |
| 2005/0185606 A1 | 8/2005 | Rayment | 2007/0014573 A1 | 1/2007 | Wei |
| 2005/0190778 A1 | 9/2005 | Ozluturk | 2007/0066308 A1* | 3/2007 | Andric et al. ............... 455/445 |
| 2005/0193357 A1 | 9/2005 | Honary | 2007/0066874 A1 | 3/2007 | Cook |
| 2005/0243765 A1 | 11/2005 | Schrader | 2007/0086361 A1 | 4/2007 | Allan |
| 2005/0246112 A1 | 11/2005 | Abhulimen | 2007/0090996 A1 | 4/2007 | Wang |
| 2005/0272430 A1 | 12/2005 | Griebling | 2007/0091871 A1 | 4/2007 | Taha |
| 2005/0281237 A1* | 12/2005 | Heinonen et al. ........... 370/338 | 2007/0140145 A1* | 6/2007 | Kumar et al. ............... 370/254 |
| 2005/0282494 A1 | 12/2005 | Kossi | 2007/0189249 A1 | 8/2007 | Gurevich |
| 2006/0031659 A1 | 2/2006 | Chow | 2007/0206521 A1 | 9/2007 | Osaje |
| 2006/0039449 A1 | 2/2006 | Fontana et al. | 2007/0206616 A1 | 9/2007 | Orth |
| 2006/0045124 A1 | 3/2006 | Dahlstrom | 2008/0181288 A1 | 7/2008 | Wurzbach |
| 2006/0095539 A1 | 5/2006 | Renkis | 2009/0046625 A1 | 2/2009 | Diener |
| 2006/0120387 A1 | 6/2006 | Yang | 2009/0098828 A1 | 4/2009 | Furman |
| 2006/0133332 A1 | 6/2006 | Achanta | 2009/0189739 A1 | 7/2009 | Wang |
| 2006/0133807 A1 | 6/2006 | Jenkins | | | |
| 2006/0133817 A1 | 6/2006 | Xie | | | |

* cited by examiner

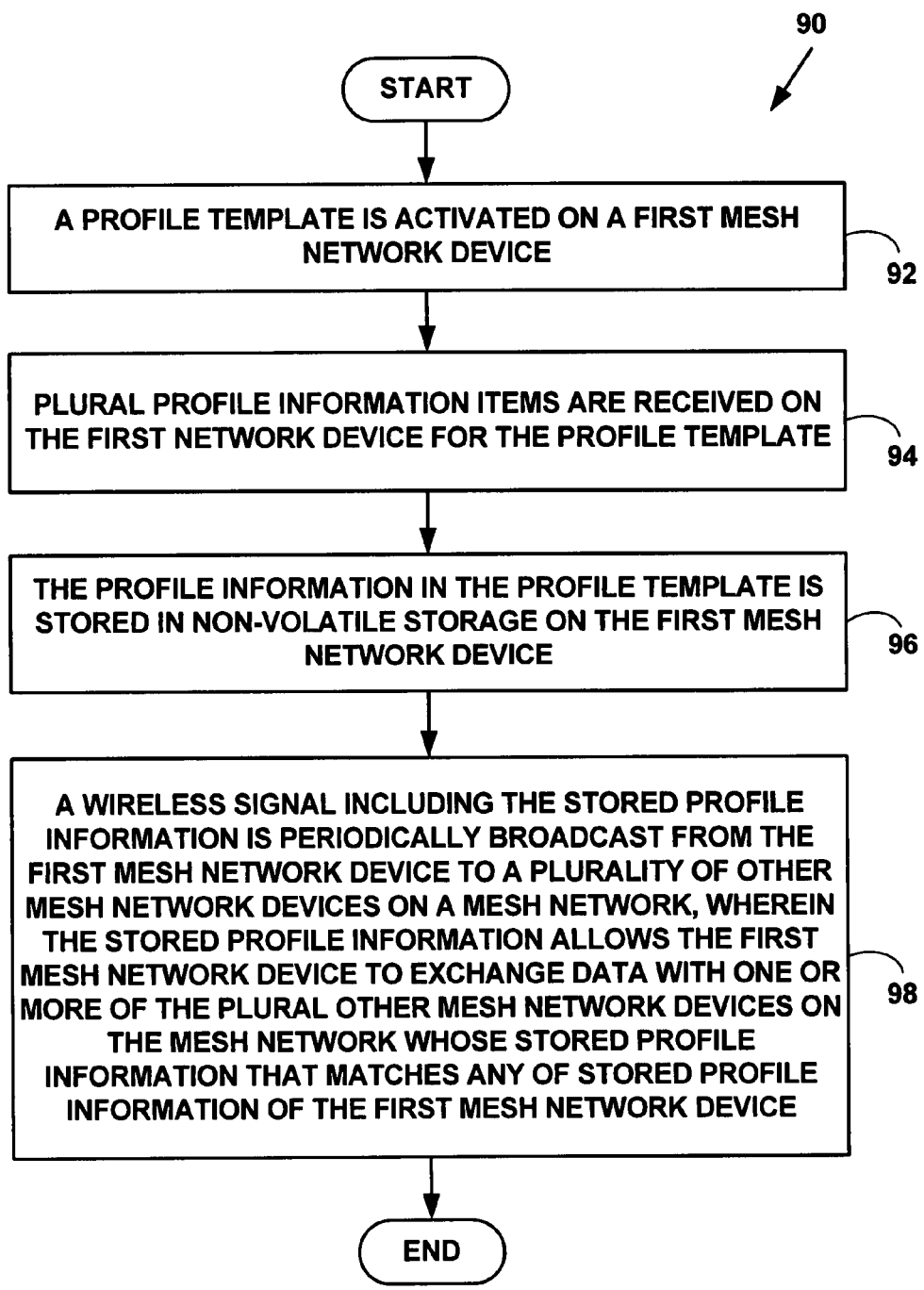

METHOD AND SYSTEM FOR DYNAMIC INFORMATION EXCHANGE ON MESH NETWORK DEVICES

CROSS REFERENCES TO RELATED APPLICATIONS

This applications claims priority to U.S. Provisional Patent Application No. 60/833,741, filed Jul. 27, 2006, the contents of which are incorporated by reference.

FIELD OF THE INVENTION

This invention relates to mesh networks, partial mesh networks and/or ad-hoc networks. More specifically, it relates to a method and system for dynamic information exchange on mesh network devices.

BACKGROUND OF THE INVENTION

There are many types of computer and communications networks in existence. One variety of such networks is a mesh network.

A mesh network is a self-organizing network built from plural mesh network nodes that may spontaneously create an impromptu network, assemble the network themselves, dynamically adapt to device failure and degradation, manage movement of mesh network nodes, and react to changes in task and network requirements. The plural mesh network nodes are reconfigurable smart network nodes that are self-aware, self-reconfigurable and autonomous.

A mesh network is a network that employs one of two connection arrangements, "full mesh" topology or "partial mesh" topology. In the full mesh topology, each node is connected directly to each of the others. In the partial mesh topology, nodes are connected to only some, not all, of the other nodes.

There are a number of problems associated with wired and wireless mesh networks. One problem is that a number of independent mesh devices each make a local decision and then try to combine these decisions at a central point to generate a global decision. Routing, bandwidth, and power constraints determine the quality of the distributed detection and/or estimation decision. Another problem is that is often difficult to determine a load on a mesh network and what resources are required to determine a desired quality of service.

Another problem is that some mesh networks are mobile networks in which it is assumed at least some of the nodes of the network are mobile units that change position over time. The dynamic management of complex routing information is very difficult. Mobile sensor networks include plural client units in such as a personal digital/data assistant (PDA), mobile phone, or other mobile unit for airport lounges, shopping malls, offices, etc.

There have been attempts to solve some of the problems associated with mesh networks. For example, U.S. Pat. No. 6,785,725 entitled "Signaling address resolution in a communication network," that issued to Ramanan teaches "a network configuration and method provide communication setup between neighbor nodes in a communication network, without broadcasting this setup information over the network. A signaling bandwidth separated from the data communication channel bandwidth facilitates address resolution over a common transmission medium. The user is not required to know any physical address properties of the neighbor nodes. This reduces the complexity of the information that a network administrator is required to manage. This processing feeds into a complete address resolution table, which is employed for controlling network communication over the main data communication channel bandwidth. Typically, substantially continuous transmission and/or reception over the signaling bandwidth is useful not only to determine the neighbor node's active address upon startup, but also while the network is running, to detect if a signaling element has been exchanged or has changed activity. The address resolution is automatically updated to reflect a new configuration."

U.S. Published Patent Application No. 20050272430 entitled "Reconfigurable micro-mesh communication system," that was published by Griebling teaches "wide area wireless networks with high network throughput and low provisioning and maintenance costs. The wireless networks comprise a distributed reconfigurable micro-mesh cluster having direct wireless link capability. Multiple channels operating at different frequencies can be used per direct wireless link. To further reduce the provisioning and maintenance costs, narrow beam antennas are used at the point of presence. To expand the wide area wireless networks into the home market, adjustable antennas are installed at homes."

U.S. Published Patent Application No. 20050243765 entitled "Mesh network and piconet work system and method" that was published by Schrader et al. teaches "a method of distributed control of a wireless mesh network without knowledge of global topology. The method includes: a station joining the network with any current member by propagating the join-request, or two meshes merging using the steps of: one mesh joining the other as a whole and then re-synchronizing its timing. The method further includes: first, each station periodically transmits a beacon; second, in response to a beacon being no longer detected, a station transmitting a bitmap of stations that it can still receive; third, each station responds by adding stations that it can receive with all of the bitmaps received from other members, and retransmitting the updated bitmap; fourth, after time for all stations to respond, all stations base current membership on the bitmap. The method further includes: determining sharable time slots that will not interfere with neighbors or other slot sharers, using and then releasing those slots."

U.S. Published Patent Application No. 20050190778 entitled "Multi-system mesh network," that was published by Ozluturk teaches "a transmission is simultaneously provided on multiple mesh networks. Retransmission between two nodes may be performed for the same communication along multiple networks in a mesh topography for the multiple networks. This permits communication to be effected in a mesh topography where one or all systems would not be able to provide a complete network connection within any given system."

U.S. Published Patent Application No. 20050074019 entitled "method and apparatus for providing mobile inter-mesh communication points in a multi-level wireless mesh network," that was published by Handforth et al. teaches "a mobile backhaul inter-mesh communication point forms an interface between a wireless mesh network on a first level and a wireless mesh network on a second, higher bandwidth, level. The two wireless networks are differentiated, e.g., by causing the mesh networks to be formed using different spectra, protocols or coding, or antennae. The mobile intra-mesh communication point functions as an access point in the lower level mesh network and as a relay point in the upper level mesh network. Utilizing mobile inter-mesh communication points facilitates deployment of wireless network access points while enabling the location of access points to follow the concentration of network users. Mobile inter-mesh communication points may be deployed in personal vehicles such as cars, trucks, and motorcycles, public transportation vehicles such as busses, trains, and aircraft, emergency vehicles such as fire trucks and ambulances, and many other types of vehicles."

However, none of these solutions solve all of the problems associated with mesh networks. Thus, it would be desirable to solve some of the problems associated with mesh networks.

SUMMARY OF THE INVENTION

In accordance with preferred embodiments of the present invention, some of the problems associated with sensor networks are overcome. A method and system for dynamic information exchange on mesh network devices is provided A mesh network device with integrated features creates an N-way mesh network with a full mesh network topology or a partial mesh network topology. The mesh network device is able to dynamically exchange information with other mesh network devices using stored profiles (e.g., personal data, advertisements, instant coupons, location-aware information, etc.) via a mesh network or partial mesh network or an ad-hoc network.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 8 is a flow diagram illustrating a method for enabling dynamic information interchange for mesh network devices.

DETAILED DESCRIPTION OF THE INVENTION

Exemplary Mesh Network System

Figure 1:
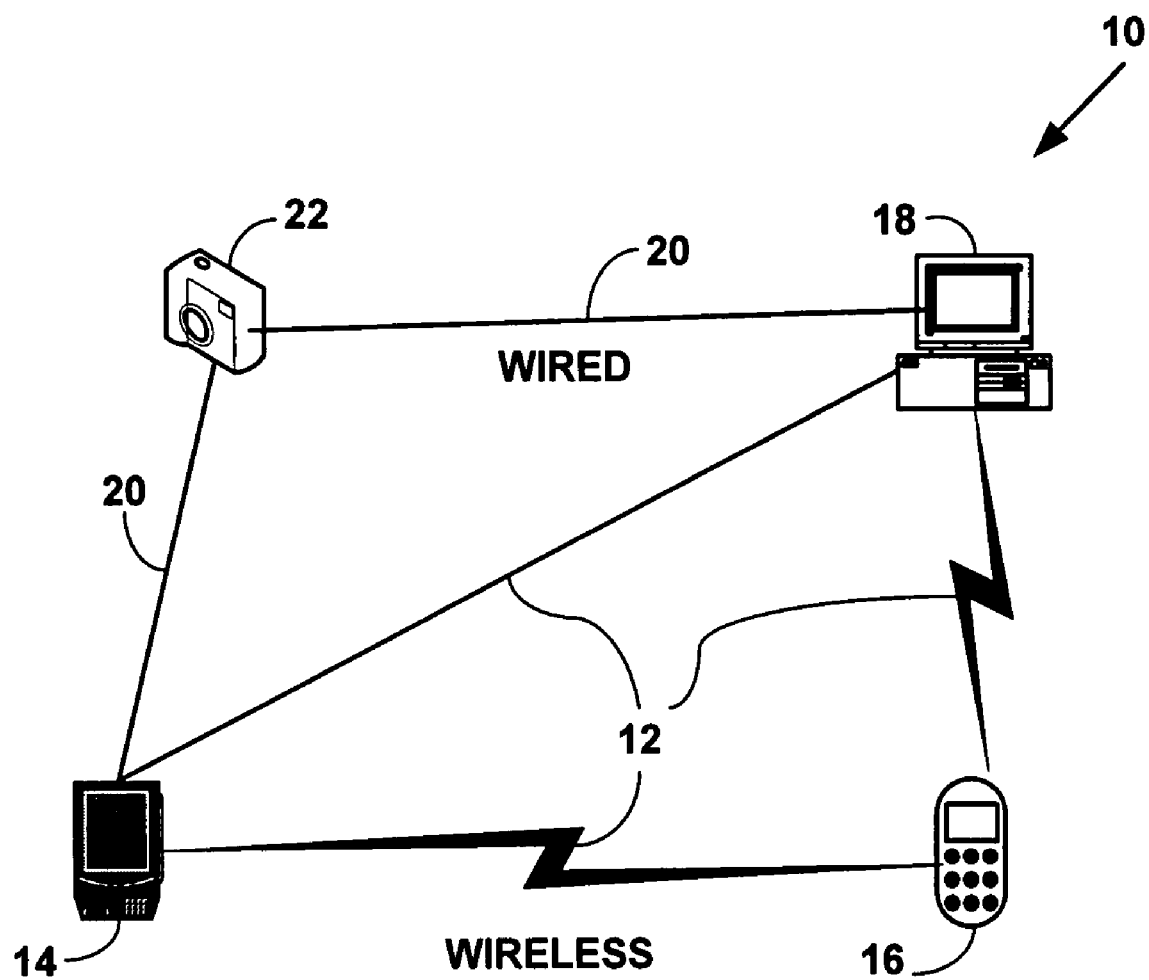
FIG. 1 is a block diagram of an exemplary mesh network.

FIG. 1 is a block diagram of an exemplary mesh network 10. A mesh network is a local area network (LAN) that employs one of two connection arrangements, "full mesh topology" or "partial mesh topology." In the full mesh topology 12, each node is a mesh network device 14, 16, 18 is connected directly to each of the other mesh network device. In the partial mesh topology 20 some mesh network devices 22 are connected to all the others, but some of the mesh network devices 22 are connected only to those other mesh network devices 18 with which they exchange the most data. The connections can be wired or wireless in a mesh 12 network or partial mesh 20 network topologies. A mesh network is reliable and offers redundancy. If one mesh node can no longer operate, all the rest can still communicate with each other, directly or through one or more intermediate nodes. Mesh networks work well when the nodes are located at scattered points that do not lie near a common line.

Some characteristics for mesh networks 12 or partial-mesh networks 20 include a network infrastructure that is decentralized, avoids a central point of failure and control, is cost effective and be maintained and expanded locally. A mesh network 12 or partial mesh network 20 includes many-to-many connections and is capable of dynamically updating and optimizing these connections. The mesh networks 12 or partial-mesh networks 20 include "mobile mesh networks" in which it is assumed that one or more of the mesh network devices dynamically change geographical location over time. Such mesh network devices may continuously change geographical location over time.

The mesh networks 12, 20 may also include embedded mesh network devices that form an "embedded mesh network." An embedded mesh network is typically a component of a larger more complex mesh network. Industrial machines, automobiles, medical equipment, cameras, household appliances, airplanes, vending machines, toys, etc. typically include embedded mesh networks. For example, an automobile may include a first embedded mesh network for anti-lock braking, a second for monitoring and maintaining oil pressure, etc. An embedded mesh network is designed to run on its own without intervention, responds to events (e.g., data collection, data transfer, etc.) in-real time and provides data to the larger more complex network.

The mesh network 12 may also include an "ad-hoc" network. As is known the art an ad-hoc network is a variety of wireless mesh network, and is a self-configuring network of mobile routers (and associated hosts) connected by wireless links, the union of which form an arbitrary topology. The routers are free to move randomly and organize themselves arbitrarily; thus, the network's wireless topology may change rapidly. Such a network may operate in a standalone mesh network fashion, or may be connected to the larger network such as the Internet. The ad-hoc mesh network includes a mobile ad-hoc network (MANet). The various types of mesh, partial or ad-hoc mesh networks include point-to-point and point-to-multipoint and multipoint-to-point operations.

The plural mesh network devices 14, 16, 18, 22 include, but are not limited to, multimedia capable desktop and laptop computers, facsimile machines, mobile phones, non-mobile phones, Internet phones, Internet appliances, personal digital/data assistants (PDA), two-way pagers, digital cameras, cable television set-top boxes, digital televisions including high definition television (HDTV) and other types of network devices. The plural mesh network devices 14, 16, 18, 22 also include embedded mesh network devices.

The plural mesh network devices 14, 16, 18, 22 may also include mesh network sensors. A mesh network sensor is a device that receives and responds to a signal or stimulus. For example a mesh network sensor may be used to measure a physical quantity such as temperature, pressure, sound, etc. and convert it into an electronic signal (e.g., digital data, digital signal, etc.). A mesh network sensor may also measure an electrical quantity (e.g., a radio signal, Radio Frequency IDentification signal (RFID) signal, etc.) and convert it into another electronic signal.

In one embodiment, the mesh network sensor is a simple device that includes an electrical circuit and a wired or wireless transceiver. In another embodiment, the mesh network sensor is a complex device (e.g., computer, PDA, mobile phone, etc.) including additional sensor functionality.

The plural network devices 14, 16, 18, 22 include one or more of a wired interface and/or a wireless interface used to connect to a mesh network 12 or partial mesh network 20 to provide voice, video and data communications.

Preferred embodiments of the present invention include mesh network devices and interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum. However, network devices based on other standards could also be used. IEEE standards can be found on the World Wide Web at the Universal Resource Locator (URL) "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." Bluetooth Forum documents can be found at the URL "www.bluetooth.com." WAP Forum documents can be found at the URL "www.wapforum.org." ADSL Forum documents can be found at the URL "www.ads1.com."

An operating environment for devices and interfaces of the present invention include a processing system with one or more high speed Central Processing Unit(s) (CPU) or other processors and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed" or "processor executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory (RAM)) or non-volatile (e.g., Read-Only Memory (ROM)) mass storage system readable by the CPU. The computer readable medium includes cooperating or interconnected computer readable medium, which exist exclusively on the processing system or be distributed among multiple interconnected processing systems that may be local or remote to the processing system.

As is known in the art, the Open Systems Interconnection (OSI) reference model is a layered architecture that standardizes levels of service and types of interaction for computers exchanging information through a communications network. The OSI reference model separates network device-to-network device communications into seven protocol layers, or levels, each building- and relying-upon the standards contained in the levels below it. The OSI reference model includes from lowest-to-highest, a physical, data-link, network, transport, session, presentation and application layer. The lowest of the seven layers deals solely with hardware links; the highest deals with software interactions at the application-program level.

In one embodiment of the present invention, the wired interfaces include wired interfaces and corresponding networking protocols for wired connections to the Public Switched Telephone Network (PSTN) or a cable television network (CATV) including HDTV that connect the network devices 14, 16, 18, 22 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others.

In one embodiment, of the invention, the wireless interfaces include WPAN wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, two-way pager, etc.)

Typically, a wireless personal area network uses some technology that permits communication only within about 10 meters. One such technology is "Bluetooth." Another such technology is "Zigbee."

A key concept in WPAN technology is known as "plugging in." In the ideal scenario, when any two WPAN-equipped devices come into close proximity (within several meters of each other) or within a few kilometers of a central server (not illustrated), they can communicate via wireless communications as if connected by a cable. WPAN devices can also lock out other devices selectively, preventing needless interference or unauthorized access to secure information.

In one embodiment of the present invention, the wireless interfaces include but are not limited to, an IEEE 802.11a, 802.11b, 802.11g, 802.11n, 802.15.4 (ZigBee), 802.16a, 802.16g, "Wireless Fidelity" (Wi-Fi), "Worldwide Interoperability for Microwave Access" (WiMAX), ETSI High Performance Radio Metropolitan Area Network (HIPERMAN) "RF Home," or other types of wireless interfaces. However, the present invention is not limited to such wireless interface and other types of wireless interfaces can also be used.

In another embodiment of the present invention, the wireless mesh network device 14, 16, 18, 22 includes a wireless sensor device that comprises an integral or separate Bluetooth and/or infra data association (IrDA) module for wireless Bluetooth or wireless infrared communications.

As is known in the art, an 802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54 Mbps. 802.11g deliver speeds on par with 802.11a. However, other 802.11xx interfaces can also be used and the present invention is not limited to the 802.11 protocols defined. The IEEE 802.11a, 802.11b and 802.11g standards are incorporated herein by reference.

As is known in the art, Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the URL "www.weca.net."

As is known in the art, 802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz ISM band (Worldwide), 10 channels in the 915 MHz (US) and one channel in the 868 MHz band (Europe). The IEEE 802.15.4-2003 standard is incorporated herein by reference. More information on 802.15.4 and ZigBee can be found at the URL "ww.ieee802.org" and "www.zigbee.org" respectively.

As is known in the art, WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the URL "www.wimaxforum.org." WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the URL "www.etsi.org." ETSI HIPERMAN can be used to provide a WLP.

As is known in the art, Bluetooth is a short-range radio frequency technology aimed at simplifying communications among network devices and between network devices. Bluetooth wireless technology supports both short-range point-to-point and point-to-multipoint connections. The Bluetooth Specification, GL 11r02, March 2005, prepared by the Bluetooth SIG, Inc. is incorporated herein by reference.

Security and Encryption

Devices and interfaces (e.g., security interface 46) of the present invention include plural security and/or encryption methods for secure communications. Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wireless or Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the URL "www.nist.gov/aes."

As is known in the art, DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

As is known in the art, RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

As is known in the art, providing a way to check the integrity of information transmitted over or stored in an unreliable medium such as a wireless network is a prime necessity in the world of open computing and communications. Mechanisms that provide such integrity check based on a secret key are called "message authentication codes" (MACS). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

As is known in the art, IP is an addressing protocol designed to route traffic within a network or between networks. For more information on IP 54 see IETF RFC-791 incorporated herein by reference.

TCP provides a connection-oriented, end-to-end reliable protocol designed to fit into a layered hierarchy of protocols that support multi-network applications. For more information on TCP 58 see RFC-793, incorporated herein by reference.

UDP provides a connectionless mode of communications with datagrams in an interconnected set of networks. For more information on UDP see ITEF RFC-768 incorporated herein by reference.

As is known in the art, the HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

As is known in the art, the SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digistal signatures. The security method are negotiated between the source and destingation at the start of establishing a protocol session. The SSL 2.0 protocol specification, by Kipp E. B. Hickman, 1995 is incorporated herein by reference. More information on SSL is available at the URL See "netscape.com/eng/security/SSL_2.html."

As is known in the art, Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

Exemplary Mesh Network Device

Figure 2:
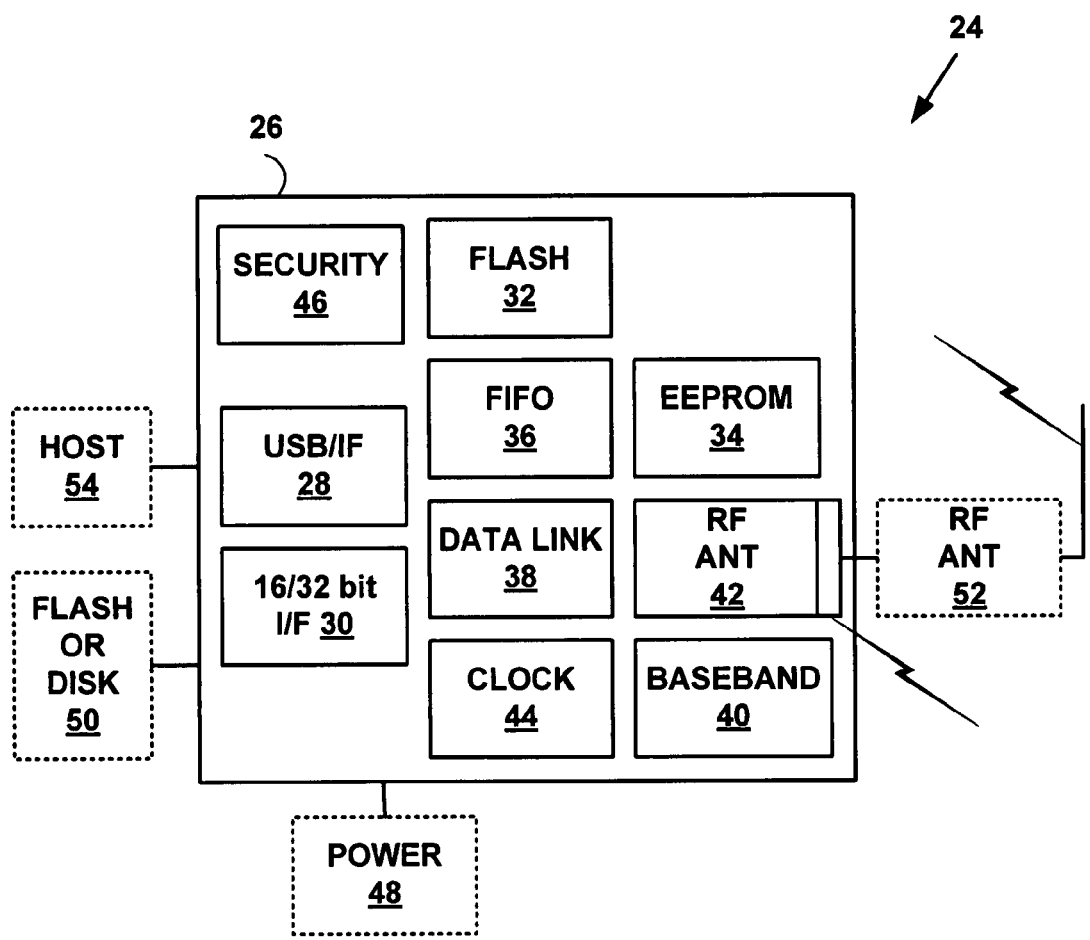
FIG. 2 is a block diagram of an exemplary hardware architecture for an mesh network device.

FIG. 2 is a block diagram illustrating an exemplary mesh network device architecture 24. The architecture 24 includes, but is not limited to, a mesh network device 26 comprising a universal serial bus (USB) interface (I/F) 28, a selectable communications bit-interface (e.g., 16/32 bit) 30, a flash memory 32, an erasable electronically programmable read only memory (EEPROM) 34, a first-in-first-out (FIFO) buffer 36, a data-link chip 38 (e.g., Medium Access Control (MAC) chip, etc.), a baseband transciever (e.g., Zigbee, Bluetooth, WiMax, etc.) 40, a wireless Radio Frequency (RF) antenna 42, a clock 44, and a security interface 46.

The EEPROM 34 may include one or more software modules used for networking (e.g., TCP/IP/UDP, etc.), security or for other purposes. In one embodiment, the security interface 46 is not a separate hardware interface but includes one more software modules included in the EEPROM 34 or in the flash memory 32.

As is known in the art, a "baseband" transceiver is a transceiver in which information is carried in digital form in one or more channels on a transmission medium. A baseband includes any frequency band on which information is superimposed, whether or not a frequency band is multiplexed and on which digital information can be sent on sub-bands.

In one embodiment, the mesh network device 26 further comprises an external power source 48 (e.g., via USB, etc.), an external flash memory or external disk drive 50, an external wireless radio frequency (RF) front end 52 (e.g., a wireless RF antenna, etc.) and an external host network device 54 (e.g., computer, PDA, mobile phone, etc.). The external flash or disk drive 50 includes, but is not limited to, a removable device such as a Compact Flash (CF), Secure Digital Card (SD), Memory Stick (MS), Micro Drive, MultiMediaCard (MMC) xD-Picture Card (xD), SmartMedia (SM) card or other removable device. However, the present invention is not limited to this embodiment and more, fewer or other components can also be used to practice the invention.

In one embodiment, the mesh network device 26 includes Complementary Code Keying (CCK). As is known in the art, CCK is a modulation scheme used with wireless networks (WLANs) that employ the IEEE 802.11b specification. A complementary code includes a pair of finite bit sequences of equal length, such that a number of pairs of identical elements (e.g., one or zero) with any given separation in one sequence are equal to a number of pairs of unlike elements having the same separation in the other sequence.

In one embodiment, the mesh network device 26 includes differential quadrature phase shift keying (DQPSK). DQPSK modulates using differential quaternary phase shift keying. DQPSK transmits only differences between values of a phase of a sin wave, rather than a full absolute value. DQPSK makes use of two carrier signals, separated by 90-degrees. The output is a baseband representation of the modulated signal.

In one embodiment, the mesh network device 26 includes differential binary phase shift keying (DBPSK). DBPSK modulates using the differential binary phase shift keying. DBPSK maps phase differences of $\theta$ and $\pi+\theta$, respectively, to outputs of zero and one, respectively, where $\theta$ is a phase rotation parameter. The output is a baseband representation of the modulated signal.

In one embodiment, the mesh network device 26 includes Orthogonal frequency division multiplexing (OFDM). OFDM is also called discrete multi-tone modulation (DMT) and is a transmission technique based upon the idea of frequency-division multiplexing (FDM) where multiple signals are sent out at different frequencies. OFDM uses a composite of narrow channel bands to enhance its performance in high frequency bands (such as 5.x GHz) in urban and rural applications where building clutter and foliage can negatively impact the propagation of radio waves for wireless devices.

In one embodiment, the mesh network device 26 includes Carrier Sense Multiple Access/Collision Avoidance (CSMA/CA). CSMA/CA is a data-link layer protocol used in the data-link chip 38 for carrier transmission in 802.11xx networks. CSMA/CA acts to prevent collisions before they happen.

In one embodiment, the mesh network device 26 is an internal device to a mesh network device 12, 14, 16, 22. In another embodiment, the mesh network device an external portable removable device as illustrated in FIG. 3. However, the present invention is not limited to such an embodiment and other embodiments can be used to practice the invention.

FIG. 3 is a block diagram illustrating an outer view 58 of a specific exemplary implementation 58 of the mesh network device 26 of FIG. 2.

Figure 3A:
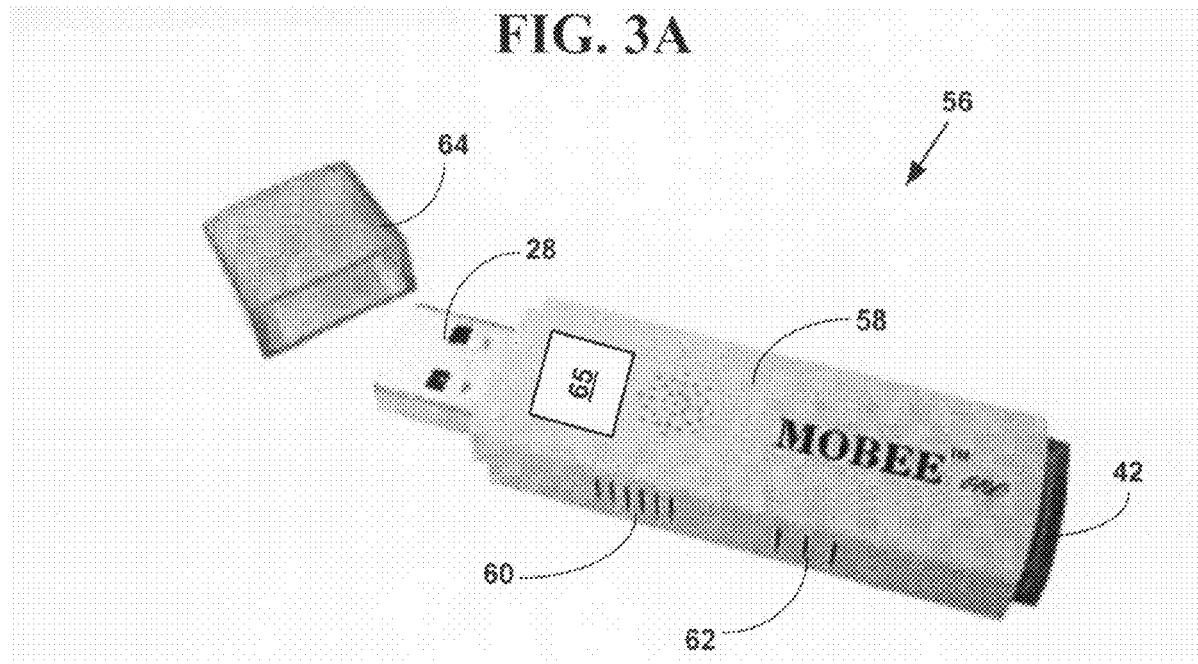
FIG. 3A is a block diagram illustrating a specific exemplary implementation of the mesh network device of FIG. 2.
Figure 3B:
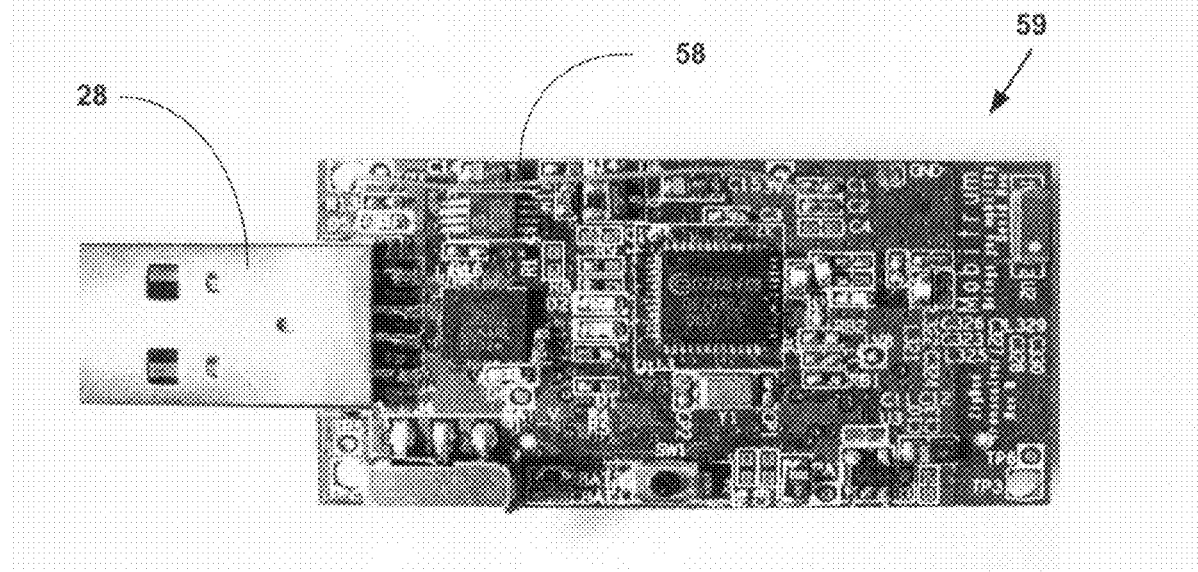
FIG. 3B is a block diagram illustrating a specific exemplary implementation of the mesh network device of FIG. 3A.

FIG. 3B is a block diagram illustrating an inner view 59 specific exemplary implementation 58 of the mesh network device of FIG. 3A.

In one embodiment, the mesh network device 58 further comprises a first light emitting diode (LED) 60 indicating when the mesh network device is connected to a mesh network or partial mesh network and a second LED 62 indicating whether the mesh network device is active. The mesh network device 58 further includes a cover 64 for the USB interface 28.

In one specific exemplary embodiment, the mesh network device 58 is called "MOBEE™" and is a self-contained USB based-mesh network device for exchanging multimedia content between mesh network devices (e.g., host devices, PC/Laptop/PDA/Smart Phone/Mobile/Smart Home devices, etc.) through a meshed mobile network to maximize communication portability.

In one embodiment, a mesh network device 26, 58 further includes a Smart Transducer Interface Modules (STIM) with an Ultra wideband transceiver (e.g., in a physical layer), a mesh network protocol adapter (e.g., in a data-link layer (e.g. MAC layer, with CCK, DBPSK, OFDM encoding etc.)) and authentication and encryption software (e.g., in data-link layer).

Ultra-wideband (UWB) refers to a radio communications technique based on transmitting very-short-duration pulses, often of duration of only nanoseconds or less, whereby the occupied bandwidth goes to very large values.

In another embodiment, the mesh network device 58 includes a Wireless Sensor Portal (WSP) with a Thin Film Transistor (TFT) high-resolution user graphic interface (GUI) 65 for displaying WSP information and sensor topology information and an Organizing Agent (OA). The OA manages the WSP and TFT. The OA is also responsible for collecting and organizing sensor data in a fashion that allows for a particular class of mesh network queries to be answered. However, the present invention is not limited to these embodiments and other embodiments can also be used.

As is known in the art, a TFT is type of LCD flat panel display screen in which each pixel is controlled by one to four transistors. TFT displays are sometimes called active matrix Liquid Crystal Diodes (LCDs).

In one exemplary embodiment, the mesh network device 26, 58 is a tiny device that integrates at least three elements together: (1) a wireless baseband module 40 such as 802.11g/b/a, 802.15.4 (ZigBee), Bluetooth, Ultra wideband 802.16x, etc.c(2) a flash memory 32; and (3) an external power source 46. The mesh network device 26, 58 may further include an external removable memory module 48 such as a Secure Digital (SD) card, Pro Multimedia Card (MMC), Memory Stick (MS), Microdrive, XD card or other external storage cards. However, the present invention is not limited to this embodiment and more, fewer or other components can also be used to practice the invention.

In one embodiment the mesh network device 26, 58 includes at least the features illustrated in Table 1. However, the present invention is not limited to the features listed in Table 1 and more, fewer or other components can also be used to practice the invention.

TABLE 1

Wireless module such as: IEEE802.11a/b/g, IEEE 802.15.4 (ZigBee), Bluetooth, Ultra wideband, or IEEE 802.16 (WiMAX)
Wireless + NAND Flash combo solution with external removable Flash memory such as Secure Digital (SD) card, Pro Multimedia Card (MMC), Memory Stick (MS), Microdrive, and XD.
Mesh networking and WPAN software
USB 2.0 interface and compatible with USB 1.1
IEEE 1394
TCP/IP/UDP
Programmable wireless RF interface
High level security includes, but are not limited to, WEP64/128/256, WPA (HW TKIP support) and AES128.
Auto-installation function
Software wireless access point In another embodiment, the specific implementation 58 of the mesh network of FIG. 3 includes at least the features illustrated in Table 2. However, the present invention is not limited to the features listed in Table 2 and more, fewer or other components can also be used to practice the invention.

TABLE 2

| | |
|---|---|
| Wireless Standards | IEEE 802.11b/g, 802.15.4 |
| Host Interface 28 | USB 2.0 Plug and Play |
| Wireless Antenna Connector 42 | Chip Antenna |
| Frequency Range | 2.412 GHz-2.4835 GHz |
| Number of Selectable Channels | USA, Canada: 11 channels<br>Europe: 13 channels<br>Asia (e.g, Japan): 14 channels |
| Modulation Techniques | Direct Sequence Spread Spectrum (CCK, DQPSK, DBPSK) Orthogonal frequency division multiplexing (OFDM) |
| Security 46 | 64/128/256 bit WEP, WPA, WPA2, CCX1.0, CCX2.0, 802.1x |
| Data-Link 38 Protocol | CSMA/CA (Collision Avoidance) with acknowledgment |
| Output RF Power | 11g: 13 dBM<br>11b: 16 dBM |
| Sensitivity | −71 dBM @ 54 Mbps<br>−84 dBM @ 11 Mbps |
| Data Rate | 802.11g (54 Mbps, 48 Mbps, 36 Mbps, 24 Mbps, 18 Mbps, 12 Mbps, 9 Mbps, 6 Mbps)<br>802.11b (11 Mbps, 5.5 Mpbs, 2 Mbps, 1 Mbps) |
| Throughput | 33 Mbps @ 11g + mode<br>24 Mbps @ 11g mode |
| LEDs 58, 60 | Link: Green<br>Active: Green |
| Weight | 10 g |
| Dimensions | 71.5 mm (L) × 19 mm (W) × 9 mm (H) |
| Power 48 Requirements | Operating Voltage: 5 V DC<br>Continuous TX Current: 350 mA @ 54 Mbps<br>Continuous TX Current: 330 mA @ 11 Mbps<br>Continuous RX Current: 245 mA<br>Typical Current 240 mA |

Exemplary Mesh Network Device Method of Use

Figure 4:
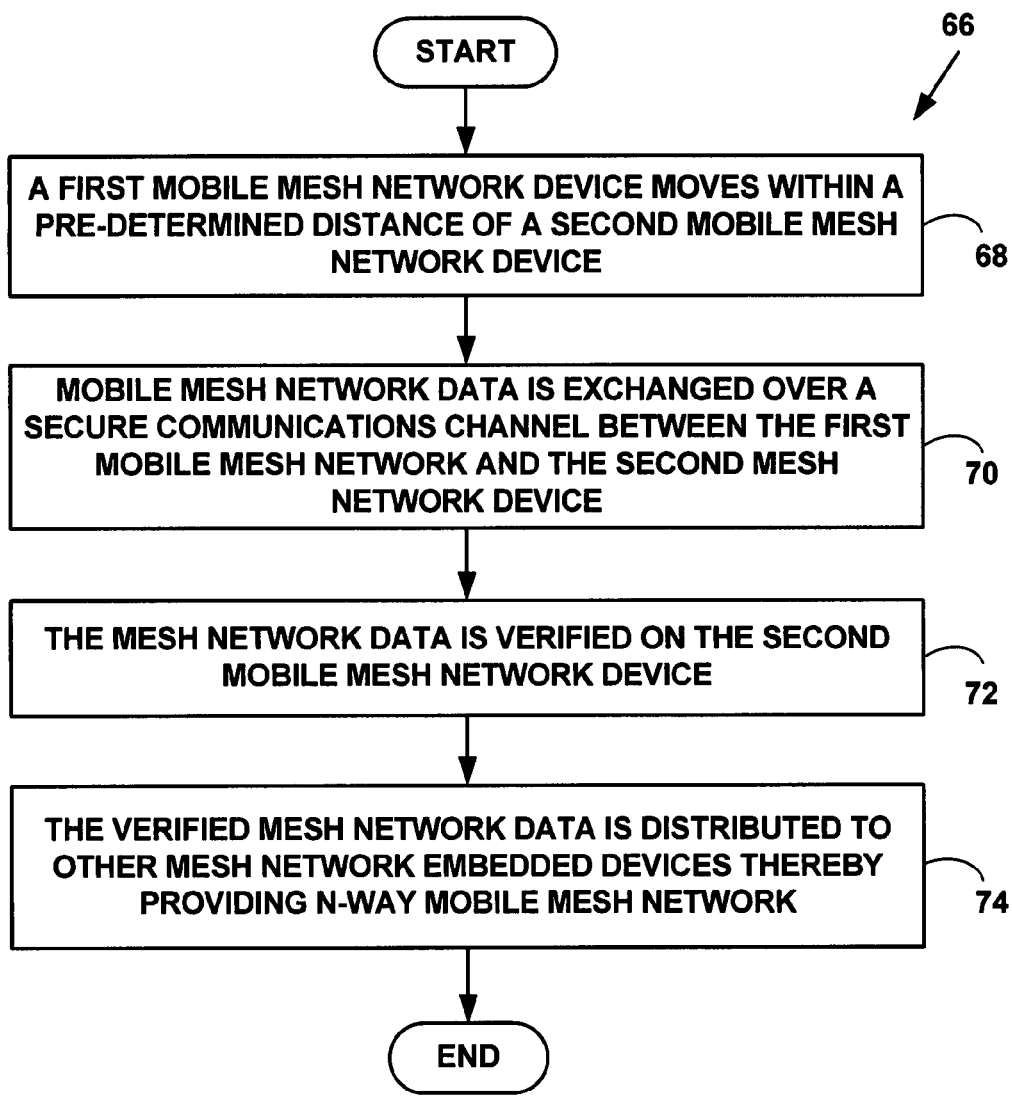
FIG. 4 is a flow diagram illustrating a method for mesh networking.

FIG. 4 is a flow diagram illustrating a Method 66 for mobile mesh networking. At Step 68, a first mobile mesh network device (e.g., 14) moves within a pre-determined distance of a second mobile mesh network device (e.g., 16), wherein the second mobile mesh network device 16 is also moving. At Step 70, mobile mesh network data is exchanged over a secure communications channel between the first mobile mesh network 14 and the second mesh network device 16. At 72, the mesh network data is verified on the second mobile mesh network device. At Step 74, the verified mesh network data is distributed to other mesh network devices (e.g., 18), if any, on the mesh network 12, thereby creating an N-way mobile mesh network 12 between the plural network devices 14, 16, 18.

Method 66 is illustrated with an exemplary embodiment. However, the present invention is not limited to such and embodiment and other embodiments can also be used to practice the invention. In such an exemplary embodiment at Step 68, a first mobile mesh network device (e.g., 14) moves within a pre-determined distance of a second mobile mesh network device (e.g., 16). The first mobile mesh network device 14 and the second mobile mesh network device 16 include implementations 26, 58 described above.

At Step 70, mesh network data is exchanged over a secure communications channel between the first mobile mesh network 14 and the second mesh network device 16 to create a mobile mesh network 12. The mesh network data includes, but is not limited to, routing data, spatial data, mesh network load data and other mesh network data.

At 72, the mesh network data is verified to the second mesh network device 16. The verification includes verifying routing paths, spatial data, mesh network load data and other mesh network data.

At Step 74, the verified mesh network device is distributed to other mesh network devices (e.g., 18), if any, on the mesh network 12, thereby creating an N-way mobile mesh network 12 between the plural network devices 14, 16, 18.

Figure 5:
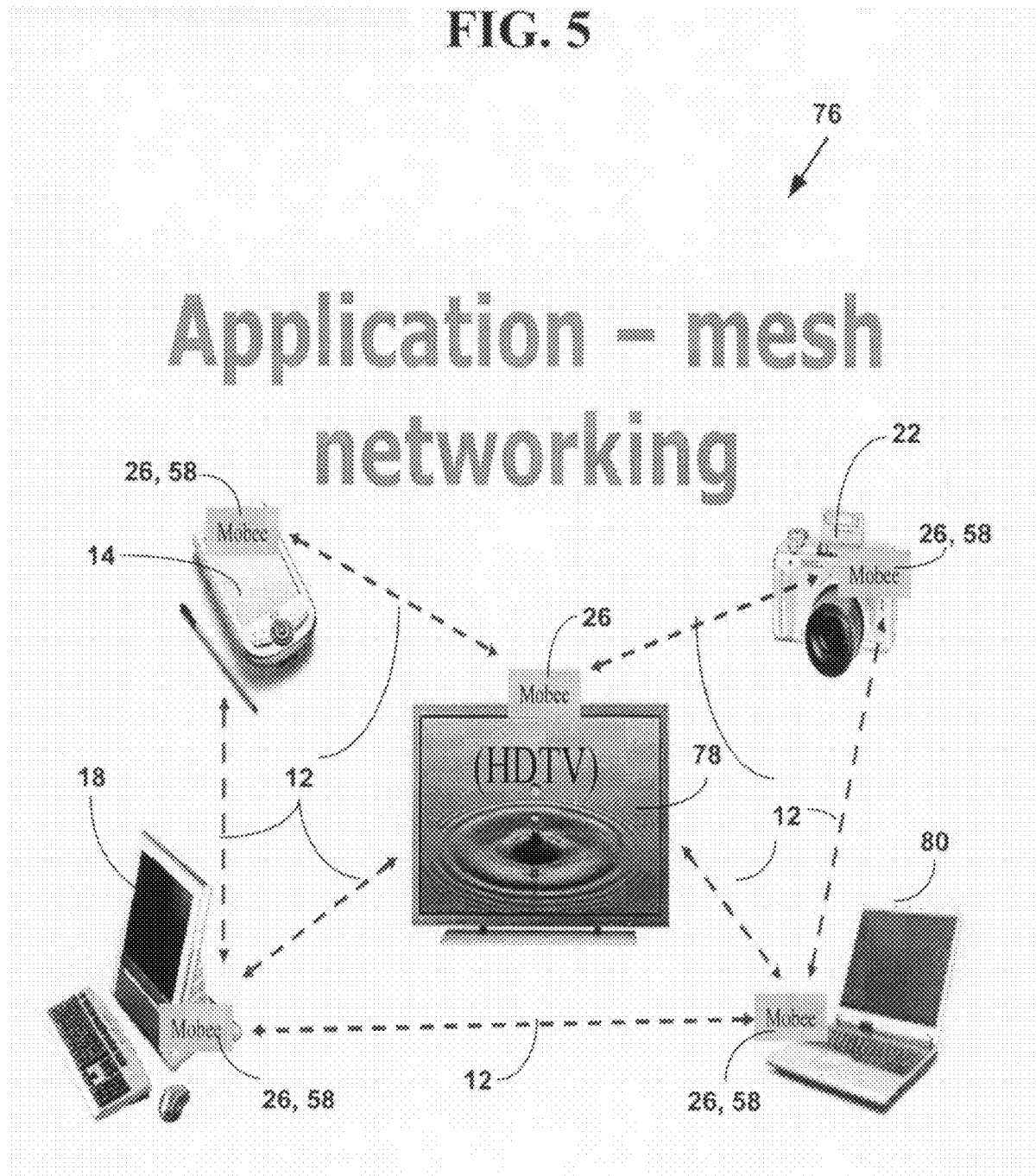
FIG. 5 is a block diagram illustrating an N-way mesh network formed using the mesh network device of FIG. 2.

FIG. 5 is a block diagram 76 illustrating an N-way mesh network formed using the mesh network device of FIG. 2. FIG. 5 illustrates two additional network devices including a television 78 and a laptop computer 80. The network devices 14, 16, 18, 22, 78, 80 in FIG. 5 are attached to the mesh network device 26 that is used to create an N-way mesh network. FIG. 5 illustrates a full mesh topology 12. However, the mesh network devices 26,58 can also be used to form a partial mesh topology 20 (not illustrated in FIG. 4).

Wireless Mesh Sensor Networks

Wireless sensor networks provide distributed network and Internet access to sensors, controls, and processors that are deeply embedded in equipment, facilities, and the environment. Wireless sensor networks provide monitoring and control capability for applications in transportation, manufacturing, health care, environmental monitoring, and safety and security. Wireless sensor networks provide low power signal processing, low power computation, and low power, low cost wireless networking capability in a compact system. Wireless sensor networks provide sensing, local control, and embedded intelligent systems in structures, materials, and environments.

In one embodiment, the mesh network device 26, 56 is an embedded mesh network device. In another embodiment, the mesh network device 26, 56 is a wireless mesh network sensor to collect and monitor spatial data. In such an embodiment, the mesh network device 26, 56 may include only selected ones of the components illustrated in FIG. 2 to make the wireless mesh sensor device simpler, smaller and less expensive.

Mesh sensor networks are used to determine spatial data including the location of objects. Location prediction is used to determine locations of a spatial phenomenon from maps of other spatial features such as building walls, natural phenomenon such as mountains, etc.

The method and system described herein also integrate wireless and wired sensor data acquisition for distributed sensing and monitoring for example, for rocket propulsion testing, agricultural efficiency, coastal management, disaster management, ecological forecasting, energy management, homeland security, and detecting ice accretion and detection of emissions, air quality, other data sensed around specific environments and other applications.

The method and apparatus described herein can be used for at least these exemplary applications: (1) Sensing and monitoring for Aircraft—icing on wings—data from heaters and sensors; (2) Aircraft emissions—collection of data around airports; (3) Verification and validation of equipment (e.g., Radio Frequency Identifiers "RFID"); and (4) Security—geo-location and personal location. However, the present invention is not limited to these applications and the present invention can be applied to other applications.

The method and apparatus described herein may provide at least the following advantages: (1) Spatial data is Extremely Difficult to Intercept—Wideband pulsed radar spreads the signal and allows more users access to a limited amount of scarce frequency spectrum, thus allowing spectrum reuse; (2) Multipath Immunity—A low path loss and low energy density minimizes interference to other services. UWB is very tolerant of interference, enabling operation within buildings, urban areas, and forests; (3) Precision Network-wide timing—Real-time, continuous position location down to a centimeter of resolution results in precision geolocation systems (4) Low Cost—Requires minimal components resulting in small size and weight; (5) Low Power—Typical consumption is in microwatts; and (6) Antennas—Can be very small (2 cm) because they are non-resonant.

Mesh Network Device Dynamic Information Exchange

Figure 6:
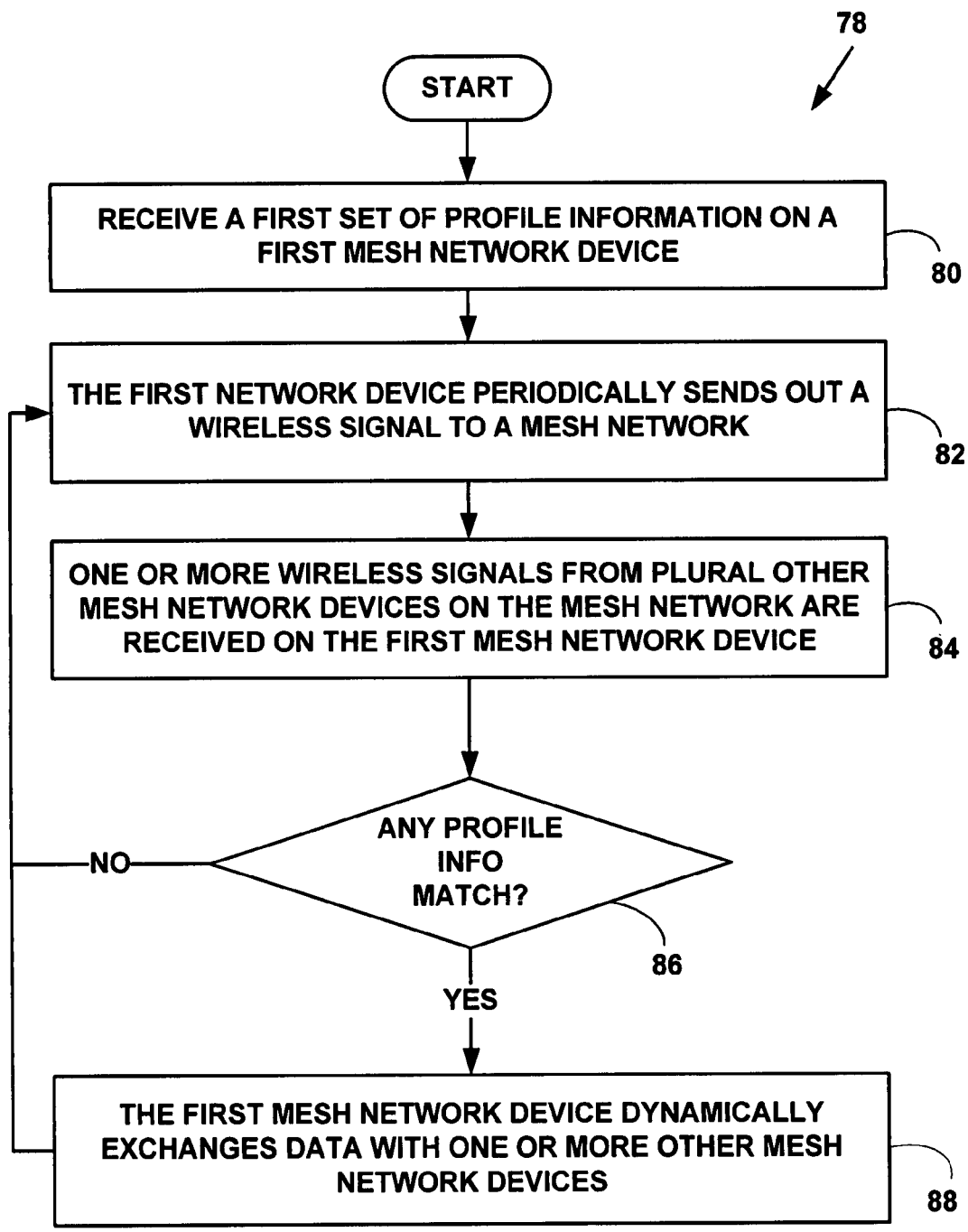
FIG. 6 is a flow diagram illustrating a method for dynamic information interchange for mesh network devices.

FIG. 6 is a flow diagram illustrating a Method 78 for dynamic information interchange for mesh network devices. At Step 80, a first set of profile information is received on a first mesh network device. At Step 82, a wireless signal is periodically sent from the first network device to a mesh network including plural other mesh network devices including other sets of profile information. At Step 84, one or more wireless signals from the plural other mesh network devices on the mesh network are received on the first mesh network device. The one or more wireless signals include other sets of profile information stored on the plural of other mesh network devices. At Step 86, a test is conducted to determine from the received one or more wireless signals whether any items in first set of profile information on the first network device match any items in other sets of profile information stored on the plural other mesh network devices. At Step 88, if any profile items match, a set of data is exchanged between the first network device and the one or more other mesh network devices via the mesh network.

Method 78 is illustrated with one exemplary embodiment. However, the present invention is not limited to such an embodiment and other embodiments can also be used to practice the invention.

In such an exemplary embodiment at Step 80, the mesh network device 56 is equipped with a short-range wireless module and flash memory as is illustrated in FIGS. 2 and 3. In another embodiment, the small mesh network device is embedded within an audio player (e.g., MP3 player, etc.) or other popular handheld devices.

At Step 80, the profile information includes, but is not limited to, an e-mail address, an IP address, a hardware address (e.g., Medium Access Control (MAC) address, etc.), a URL, a name, an address, an telephone number, an instant message identifier, a text message identifier, a encryption key, a digital signature, a secure message digest, a security identifier, a mesh network identifier or other types of profile information such as advertisements, public or emergency notices, location specific information including location-aware information. However, the present invention is not limited to such profile information and other profile information can also be used.

At Step 80, a user profile is entered or edited through a template stored on the mesh network device 56 or via a web-site on a server on the mesh network 12 or on another public or private network such as the Internet or an intranet. The user profile is saved to the first mesh network device 56 via USB connection. Personal information is stored in the flash 32. The user of the mesh network device selects one, several or all of the items in the user profile to match to user profiles in other mesh network devices. The profile information may also be entered through the display 66.

At Step 82, a wireless signal is periodically sent out via the wireless antenna 42 periodically to the mesh network 12. (e.g., sent out to other mesh network devices up to 10 meters away).

The user profile includes virtually any type of information such as, gender, age, Looking for . . . , Hobby, e-mail address, home address, home telephone number, work information, advertising, etc.

At Step 84, one or more wireless signals from the plural other mesh network devices 56', 56" on the mesh network 12 are received on the first mesh network device 56. The one or more wireless signals include other sets of profile information stored on the plural of other mesh network devices 56', 56".

At Step 86, a test is conducted to determine if the first set of profile information matches any other sets of profile information stored on other mesh network devices 56', 56", and if so, the first mesh network device 56 exchanges a set of data with the one or more other mesh network devices 56', 56".

At Step 88, when a mesh network device 56' 56", etc. matches any selected information (one, several, all items) in the first mesh network device 56, data is dynamically exchanged wirelessly and stored on each other's Flash memory in the mesh network devices. In one embodiment, the data is securely exchanged using a pre-determined security and/or encryption method.

The received data is retrievable via display 66, a computer or other interface (e.g., web-site page, etc.). The data dynamically exchange includes one, several or all items stored in the profile and/or other types of data stored on the mesh network devices. For example, a user of the first mesh network device 26, 56, may wish to dynamically exchange audio files such as MP3 files, etc. with a friend's mesh network device 26', 56'. At Step 88, the two mesh user devices 26, 56 and 26' and 56' may exchange MP3 files based on a set of designated e-mail addresses (e.g., the first user's and the friend's e-mail, etc.).

As is known in the art Motion Picture Expert Group (MPEG) Audio Layer 3, more commonly referred to as "MP3," is a popular encoding format for audio information.

In such an example both the user profile on the first mesh network device 26, 56 and the friend's mesh network device 26', 56' may include both e-mail addresses. In another embodiment, the user profiles may only include one designated e-mail address (e.g., the e-mail address of the user of the first mesh network device, etc.).

Figure 7:
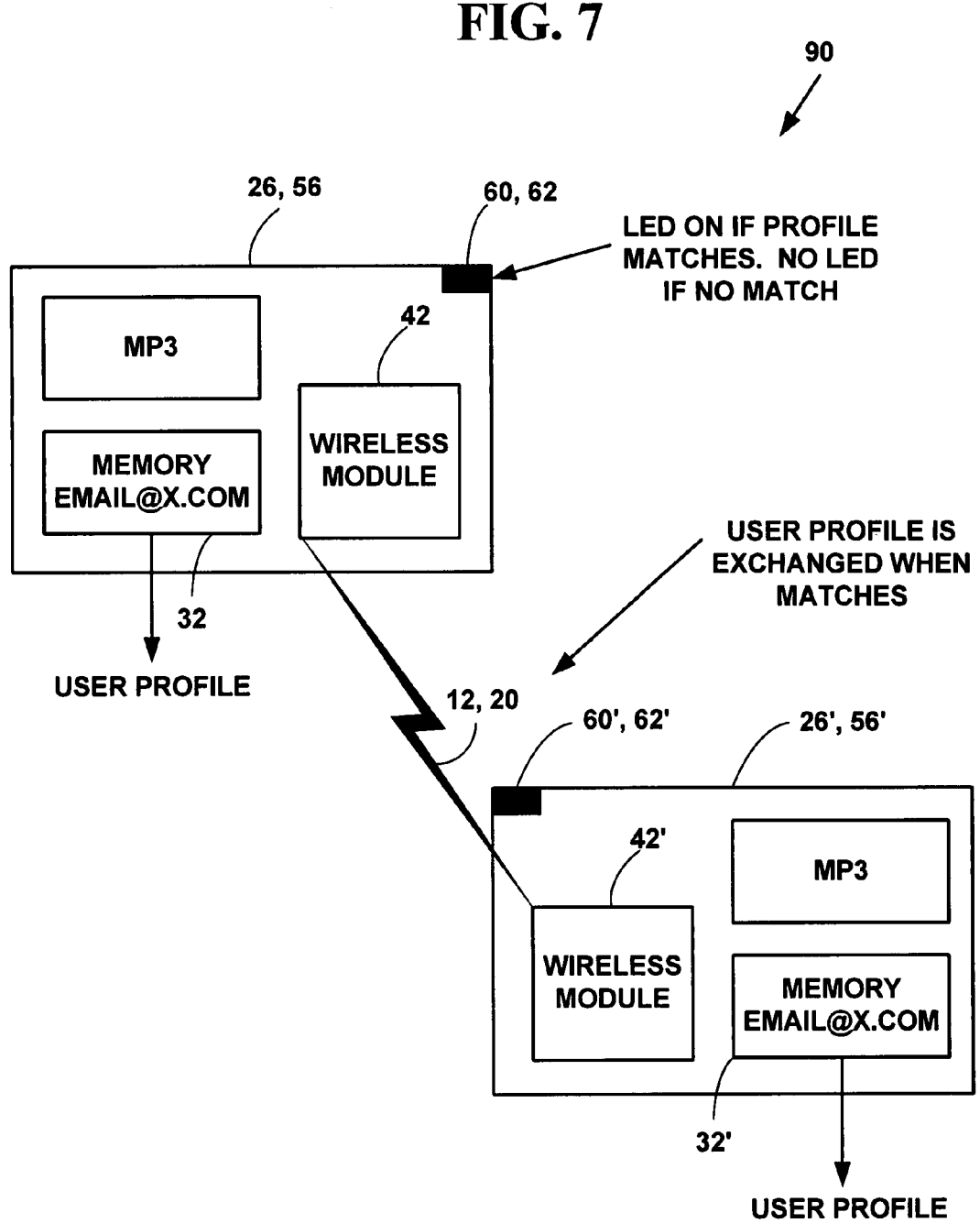
FIG. 7 is a block diagram illustrating a data flow for dynamic information interchange for mesh network devices.

FIG. 7 is a block diagram illustrating a data flow 90 for dynamic information interchange for mesh network devices using Method 78.

FIG. 8 is a flow diagram illustrating a Method 90 for enabling dynamic information interchange for mesh network devices. At Step 92, a profile template is activated on a first mesh network device. At Step 94, plural profile information items are received on the first network device for the profile template. At Step 96, the profile information in the profile template is stored in non-volatile storage on the first mesh network device. At Step 98, a wireless signal including the stored profile information is periodically broadcast from the first mesh network device to plural other mesh network devices on a mesh network. The stored profile information allows the first mesh network device to exchange data with one or more of the plural other mesh network devices on the mesh network whose stored profile information that matches any of stored profile information of the first mesh network device.

Method 90 is illustrated with one exemplary embodiment. However, the present invention is not limited to such an embodiment and other embodiments can also be used to practice the invention.

In such an exemplary embodiment at Step 92, a profile template is activated on a first mesh network device 26, 56. In one embodiment the profile template is activated when a user plugs the mesh network device 26, 56 in a USB port on a computer or other device. In such an embodiment, flash 32 or EEPROM 34 includes a URL to allow the first mesh network device to obtain a profile template. The URL is used to access the profile template at another location on the mesh network 12. In such an embodiment, a user is directed via the URL to a user login page or web page from which the user is allowed to obtain, view and fill a profile template.

In another embodiment, at Step 92 the profile template is stored directly in flash 32 or EEPROM 34 of the first mesh network device 26, 56 and is activated as part of an initialization sequence for the first mesh network device 26, 56. In such an embodiment, the profile template can be re-activated at a later time to change profile items. In one embodiment, the profile template is securely stored using a pre-determined security and/or encryption method.

In either embodiment, the profile items can be viewed via display 65 or via host 54 (e.g., a user computer via a USB port, etc).

At Step 94, plural profile information items are received on the first network device 26, 56 for the profile template. In one embodiment, the profile information items are entered via a user-friendly Hyper Text Markup Protocol (HTML) or extensible Markup Language (XML) based-web page. However, the present embodiment is not limited to this embodiment and the profile information items can be entered via other means.

At Step 96, the profile information in the profile template is stored in non-volatile storage (e.g., flash 32, etc.) on the first mesh network device 26, 56. The profile information may also be stored in other devices (e.g., a mesh network server) on other locations on the mesh network 12. For example, if the profile template was activated via a URL, the profile template items may also be stored on the device identified by the URL.

At Step 98, a wireless signal including the stored profile information is periodically broadcast from the first mesh network device 26, 56 to plural other mesh network devices 56', 56" on the mesh network 12. The stored profile information allows the first mesh network device to exchange data with one or more of the plural other mesh network devices on the mesh network whose stored profile information that matches any of stored profile information of the first mesh network device using Method 78 and other methods.

A mesh network device with integrated features creates an N-way mesh network with a full mesh network topology or a partial mesh network or an ad-hoc network topology. The mesh network device is able to dynamically exchange information with other mesh network devices using stored profiles (e.g., personal data, advertisements, instant coupons, location-aware information, etc.) via a mesh network or partial mesh network or ad-hoc network.

It should be understood that the architecture, programs, processes, methods and It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A method for dynamic information interchange for mesh network devices, comprising:

receiving a first set of profile information on a first mesh network device, wherein the first mesh network device includes an ultra wideband wireless transceiver and a mesh network protocol adapter with Complementary Code Keying (CCK), Differential Quaternary Phase Shift Keying (DQPSK) or Orthogonal Frequency Division Multiplexing (OFDM) encoders;

sending periodically a wireless signal from the first network device to a mesh network including a plurality of other mesh network devices including other sets of profile information, wherein one or more of the plurality of other mesh network devices include an ultra wideband wireless transceiver and a mesh network protocol adapter with Complementary Code Keying (CCK), Differential Quaternary Phase Shift Keying (DQPSK) or Orthogonal Frequency Division Multiplexing (OFDM) encoders and;

receiving one or more wireless signals from the plurality other mesh network devices on the mesh network, wherein the one or more wireless signals include the other sets of profile information stored on the plurality of other mesh network devices; and determining from the received one or more wireless signals whether any items in first set of profile information on the first network device match any items in the other sets of profile information stored on the plurality of other mesh network devices, and if so, exchanging a set of data between the first network device and any of the one or more other mesh network devices for which any profile information matches via the mesh network.

2. The method of claim 1 further comprising a non-transitory computer readable medium having stored therein instructions for causing one or more processors to execute the steps of the method.

3. The method of claim 1 wherein the first set of profile information includes an e-mail address, an Internet Protocol (IP) address, a hardware address, a universal resource locator (URL), a name, a street address, an telephone number, an instant message identifier, a text message identifier, a encryption key, a digital signature, a secure message digest, a security identifier, a mesh network identifier, public or emergency notices or location specific information including location-aware information.

4. The method claim 1 wherein the step of sending periodically a wireless signal includes sending an IEEE 802.15.4 (ZigBee) wireless protocol signal.

5. The method of claim 1 wherein the step of sending periodically a wireless signal includes sending an IEEE 802.11a, 802.11b, 802.11g, 802.11n, 802.16a or 802.16g wireless protocol signal.

6. The method of claim 1 wherein the step of exchanging a set of data includes securely exchanging a set of data between the first network device and the one or more other mesh network devices via the mesh network using a pre-determined security method.

7. The method of claim 1 wherein the step of receiving a first set of profile information includes receiving the first set of profile on a Universal Serial Bus (USB) interface on the first mesh network device.

8. The method of claim 1 wherein exchanging a set of data includes exchanging one or more audio files.

9. The method of claim 8 wherein the one or more audio files include Motion Picture Expert Group (MPEG) Audio Layer 3 (MP3) audio files.

10. The method of claim 1 further comprising:
activating a profile template on the first mesh network device;
receiving a plurality of profile information items on the first network device for the profile template via the mesh network;
storing the received plurality of profile information in the profile template in non-volatile storage on the first mesh network device; and
broadcasting periodically a wireless signal including the stored profile information from the first mesh network device to the plurality of other mesh network devices on the mesh network,
wherein the stored profile information allows the first mesh network device to exchange data with one or more of the plurality of other mesh network devices on the mesh network whose stored profile information matches any of stored profile information of the first mesh network device.

11. The method of claim 10 further comprising a non-transitory computer readable medium having stored therein instructions for causing one or more processors to execute the steps of the method.

12. The method claim 11 wherein the step of broadcasting periodically a wireless signal includes broadcasting an IEEE 802.15.4 (ZigBee) wireless protocol signal.

13. The method claim 11 wherein step of storing the profile information includes securely storing the profile template in non-volatile storage on the first mesh network device using a pre-determined security method.

14. The method of claim 10 herein the step of activating a profile template on a first mesh network device includes:
retrieving the profile template from non-volatile storage on the first mesh network device; and
displaying the retrieved profile template on a display associated with the first mesh network device.

15. The method of claim 10 wherein the step of activating a profile template on a first mesh network device includes:
retrieving an electronic link from non-volatile storage on the first mesh network device; and
retrieving the profile template from another location on the mesh network using the retrieved electronic link; and
displaying the retrieved profile template on a display associated with the first mesh network device.

16. The method of claim 10 wherein the step of broadcasting periodically a wireless signal includes securely broadcasting periodically a wireless signal from the first network device to the one or more other mesh network devices via the mesh network.

17. The method of claim 1 wherein the step of sending broadcasting periodically a wireless signal includes broadcasting an IEEE 802.11a, 802.11b, 802.11g, 802.11n, 802.16a or 802.16g wireless protocol signal.

18. The method of claim 1 wherein the first mesh network device comprises a wireless mesh network sensor or an embedded mesh network device embedded into another network device.

19. A system for dynamic information interchange for mesh network devices, comprising, in combination:
means for activating a profile template on a first mesh network device, wherein the first mesh network device includes an ultra wideband wireless transceiver and a mesh network protocol adapter with Complementary Code Keying (CCK), Differential Quaternary Phase Shift Keying (DQPSK) or Orthogonal Frequency Division Multiplexing (OFDM) encoders, for receiving a plurality of profile information items on the first network device for the profile template and for storing the profile information in the profile template in non-volatile storage on the first mesh network device; and
means for sending or broadcasting periodically a wireless signal from the first network device to a mesh network including a plurality of other mesh network devices including other sets of profile information, wherein one or more of the plurality of other mesh network devices include an ultra wideband wireless transceiver and a mesh network protocol adapter with Complementary Code Keying (CCK), Differential Quaternary Phase Shift Keying (DQPSK) or Orthogonal Frequency Division Multiplexing (OFDM) encoders; for receiving one or more wireless signals from the plurality other mesh network devices on the mesh network, wherein the one or more wireless signals include the other sets of profile information stored on the plurality of other mesh network devices; and for determining from the received one or more wireless signals whether any items in first set of profile information on the first network device match any items in the other sets of profile information stored on the plurality of other mesh network devices, and if so, exchanging a set of data between the first network device and any of the one or more other mesh network devices for which any profile information matches via the mesh network.

20. The system of claim 19 wherein wireless signal includes an IEEE 802.15.4 (ZigBee), IEEE 802.11a, 802.11b, 802.11g, 802.11n, 802.16a or 802.16g wireless protocol signal.

* * * * *